(12) United States Patent
Saito

(10) Patent No.: US 7,254,145 B2
(45) Date of Patent: Aug. 7, 2007

(54) DATA TRANSMISSION APPARATUS AND A PATH CONTROL METHOD THEREOF

(75) Inventor: Fumihiko Saito, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1055 days.

(21) Appl. No.: 10/112,212

(22) Filed: Mar. 28, 2002

(65) Prior Publication Data

US 2003/0043861 A1 Mar. 6, 2003

(30) Foreign Application Priority Data

Aug. 31, 2001 (JP) ............................. 2001-264704

(51) Int. Cl.
*H04J 3/02* (2006.01)
(52) U.S. Cl. .................. 370/539; 370/540; 370/541
(58) Field of Classification Search ............... 370/229, 370/230, 230.1, 232–235, 236.2, 238, 389, 370/392–394, 395.1, 395.51, 437, 445, 464–465, 370/471–473, 474, 479, 538–543
See application file for complete search history.

(56) References Cited

U.S. PATENT DOCUMENTS

| 6,078,575 A * | 6/2000 | Dommety et al. | 370/338 |
| 6,490,451 B1 * | 12/2002 | Denman et al. | 455/436 |
| 6,697,373 B1 * | 2/2004 | Sandstrom | 370/405 |
| 6,856,612 B1 * | 2/2005 | Bjelland et al. | 370/338 |
| 6,876,634 B1 * | 4/2005 | Lim | 370/310.1 |
| 6,925,074 B1 * | 8/2005 | Vikberg et al. | 370/338 |
| 6,999,470 B2 * | 2/2006 | Murton et al. | 370/466 |
| 7,042,904 B2 * | 5/2006 | Kamiya | 370/466 |
| 7,167,459 B2 * | 1/2007 | Spear et al. | 370/331 |

* cited by examiner

*Primary Examiner*—Wellington Chin
*Assistant Examiner*—Mark A. Mais
(74) *Attorney, Agent, or Firm*—Katten Muchin Rosenman LLP

(57) ABSTRACT

A data transmission apparatus using a virtual concatenated path in an SDH transmission system is capable of engaging one or more extra paths by an automated sequence execution to meet a traffic requirement that is higher than usual but up to a maximum speed of a user who is usually assigned virtual concatenated paths in a number smaller than capable of transmitting the maximum traffic.

24 Claims, 19 Drawing Sheets

FIG.1
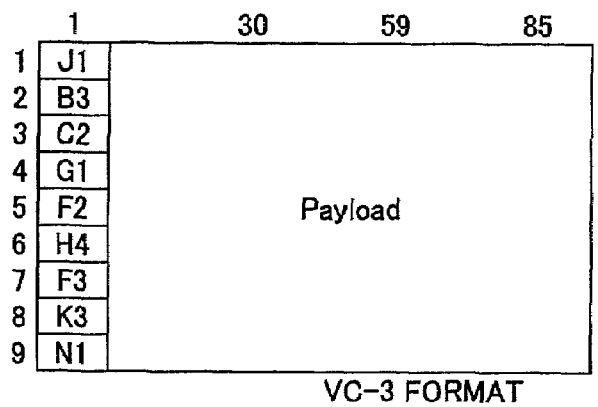
VC-3 FORMAT
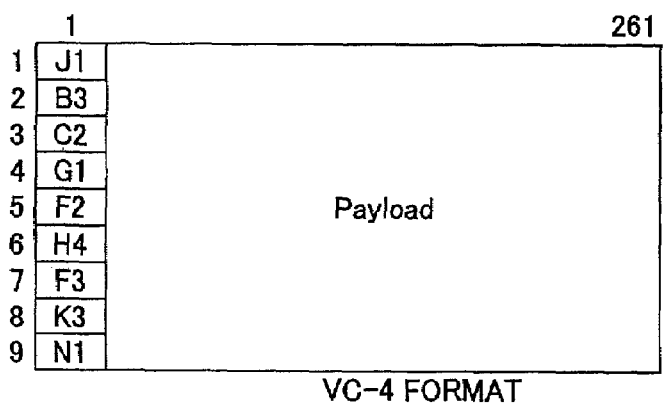
VC-4 FORMAT
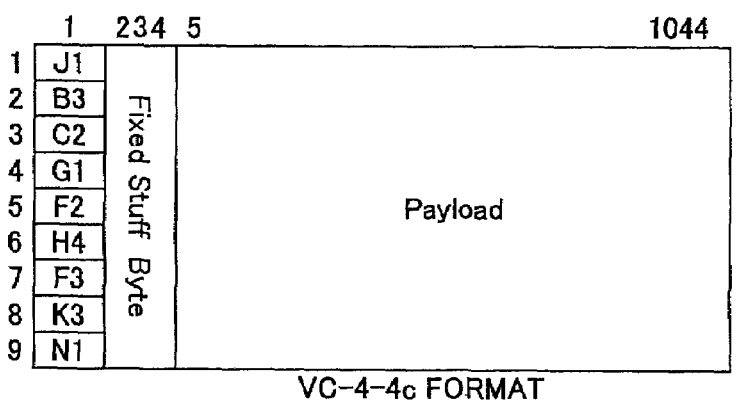
VC-4-4c FORMAT
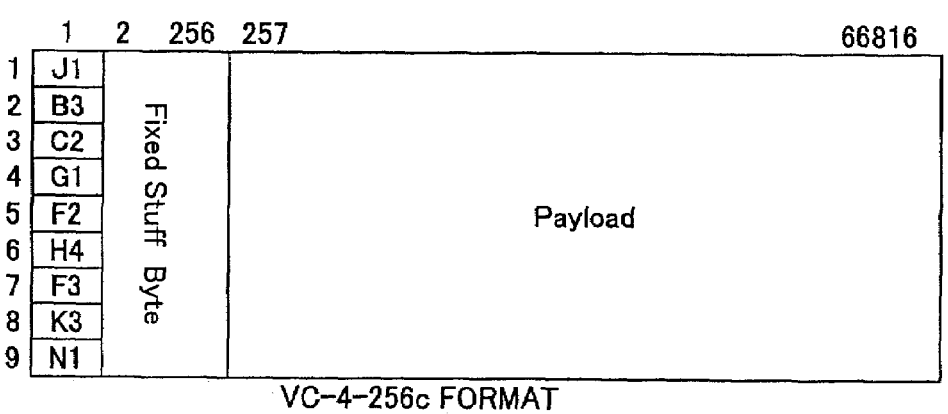
VC-4-256c FORMAT

FIG.2
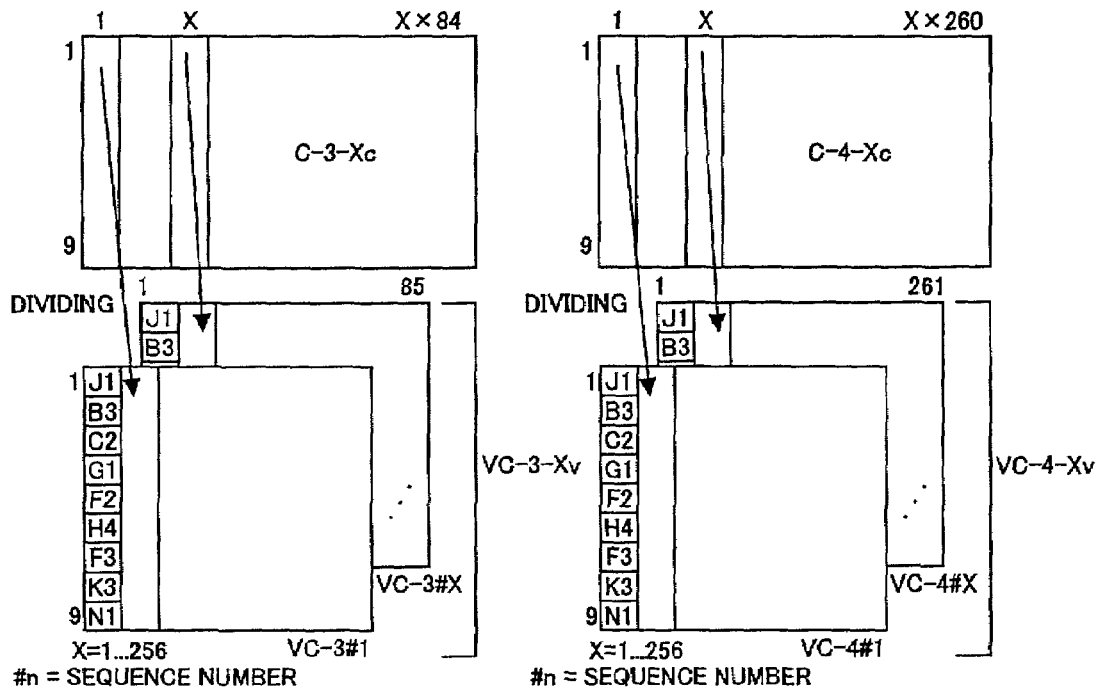
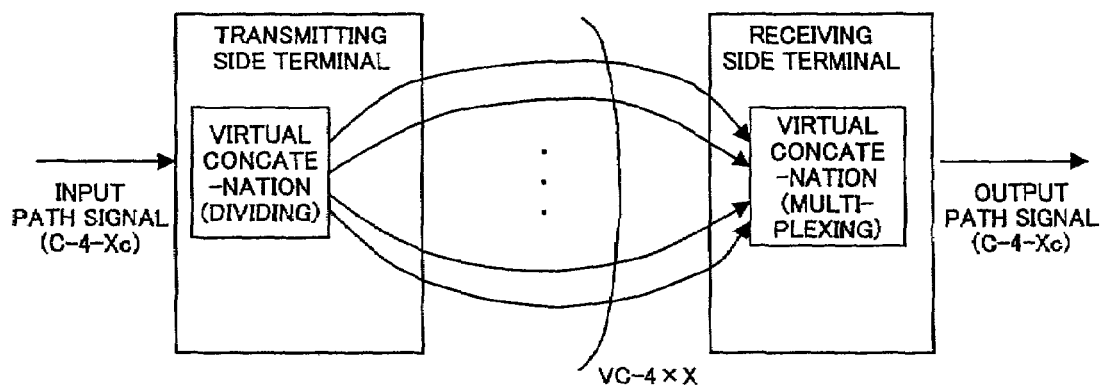

FIG.3

| H4 BYTE | | | | | | | | FIRST MULTI-FRAME NUMBER | SECOND MULTI-FRAME NUMBER |
|---|---|---|---|---|---|---|---|---|---|
| Bit 1 | Bit 2 | Bit 3 | Bit 4 | Bit 5 | Bit 6 | Bit 7 | Bit 8 | | |
| SEQUENCE NUMBER MSB 4 BITS | | | | 1 | 1 | 1 | 0 | 14 | n-1 |
| SEQUENCE NUMBER LSB 4 BITS | | | | 1 | 1 | 1 | 1 | 15 | |
| SECOND MULTI-FRAME ID NUMBER MSB | | | | 0 | 0 | 0 | 0 | 0 | n |
| SECOND MULTI-FRAME ID NUMBER LSB | | | | 0 | 0 | 0 | 1 | 1 | |
| *NOTE | UNUSED | | | 0 | 0 | 1 | 0 | 2 | |
| UNUSED | | | | 0 | 0 | 1 | 1 | 3 | |
| UNUSED | | | | 0 | 1 | 0 | 0 | 4 | |
| UNUSED | | | | 0 | 1 | 0 | 1 | 5 | |
| UNUSED | | | | 0 | 1 | 1 | 0 | 6 | |
| UNUSED | | | | 0 | 1 | 1 | 1 | 7 | |
| UNUSED | | | | 1 | 0 | 0 | 0 | 8 | |
| UNUSED | | | | 1 | 0 | 0 | 1 | 9 | |
| UNUSED | | | | 1 | 0 | 1 | 0 | 10 | |
| UNUSED | | | | 1 | 0 | 1 | 1 | 11 | |
| UNUSED | | | | 1 | 1 | 0 | 0 | 12 | |
| UNUSED | | | | 1 | 1 | 0 | 1 | 13 | |
| SEQUENCE NUMBER MSB 4 BITS | | | | 1 | 1 | 1 | 0 | 14 | |
| SEQUENCE NUMBER MSB 4 BITS | | | | 1 | 1 | 1 | 1 | 15 | |
| SECOND MULTI-FRAME ID NUMBER MSB | | | | 0 | 0 | 0 | 0 | 0 | |
| SECOND MULTI-FRAME ID NUMBER LSB | | | | 0 | 0 | 0 | 1 | 1 | n+1 |

*NOTE: AVAILABLE TO "CHANGE FROM NEXT MULTI-FRAME" FLAG

FIG.13

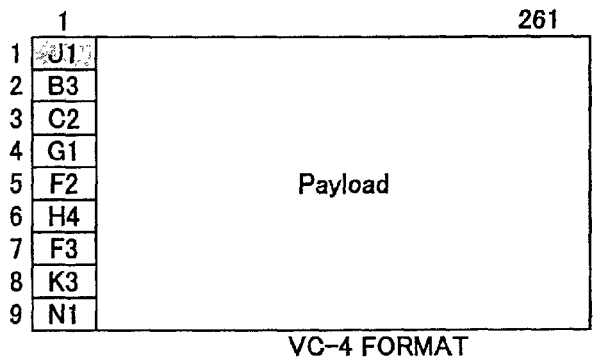

VC-4 FORMAT

| J1 BYTE | | | | | | | |
|---|---|---|---|---|---|---|---|
| BIT 1 | BIT 2 | BIT 3 | BIT 4 | BIT 5 | BIT 6 | BIT 7 | BIT 8 |
| DEMAND/ RESPONSE | DEMANDING VIRTUAL CONCATENATED PATH ID | | | INCREASE / DECREASE | DEMANDED EXTRA PATH ID/RESPONSE | | |

| DEMAND/RESPONSE | |
|---|---|
| 0 | NO DEMAND OR RESPONSE |
| 1 | CHANGE DEMAND |

| INCREASE/DECREASE | |
|---|---|
| 0 | INCREASE DEMAND |
| 1 | DECREASE DEMAND |

| DEMAND EXTRA PATH ID/RESPONSE TYPES | | | | |
|---|---|---|---|---|
| | BIT 6 | BIT 7 | BIT 8 | |
| WHEN DEMANDING | X | X | X | ID OF DEMANDED EXTRA PATH |
| WHEN RESPONDING | 0 | 0 | 0 | UNUSED |
| | 0 | 0 | 1 | NORMAL RESPONSE |
| | 0 | OTHER THAN ABOVE | | UNUSED |
| | 1 | 0 | 0 | ABNORMAL RESPONSE (ABNORMAL DEMAND) |
| | 1 | 0 | 1 | ABNORMAL RESPONSE (EXTRA PATH FAILURE) |
| | 1 | 1 | 0 | ABNORMAL RESPONSE (EXTRA PATH NOT SETTABLE) |
| | 1 | 1 | 1 | UNUSED |

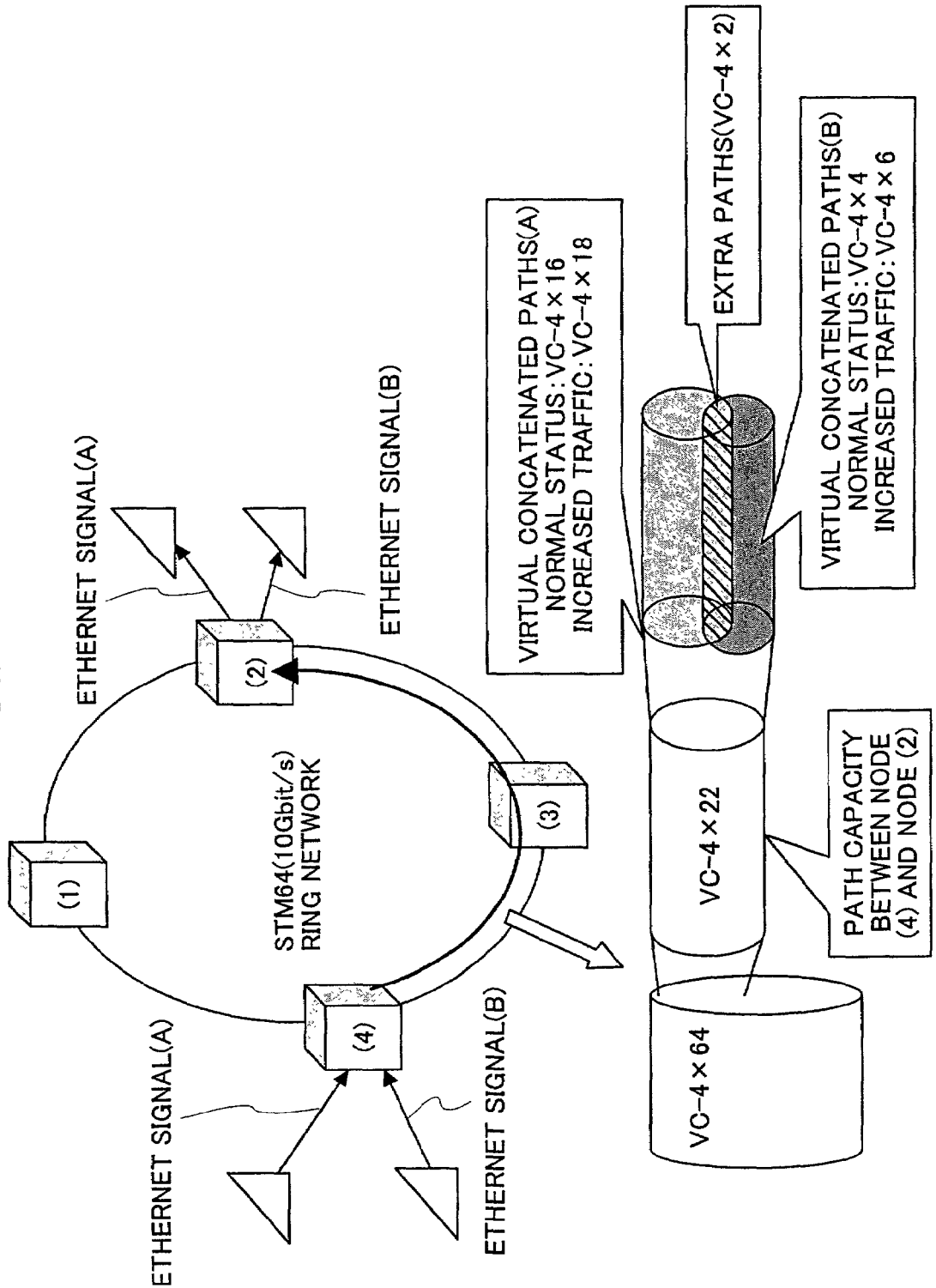

DATA TRANSMISSION APPARATUS

INTERFACE PANEL INSTALLED IN THIS POSITION IS ASSIGNED WITH UNIQUE VC NUMBERS, SUCH AS VC-4#1 THROUGH VC-4#16 AS DEFAULT PATHS AND VC-4#17 AND VC-4#18 AS EXTRA PATHS.

DATA TRANSMISSION APPARATUS AND A PATH CONTROL METHOD THEREOF

BACKGROUND OF THE INVENTION

1. Field of the Invention

The present invention generally relates to a data transmission apparatus and a path control method thereof, using a virtual concatenated (VC) path in an SDH (Synchronous Digital Hierarchy) transmission system, and especially relates to the data transmission apparatus and the path control method thereof, which effectively control the number of virtual concatenated paths to be used in response to an increase and a decrease in an amount of IP data in the data transmission system using the virtual concatenated path method that is effective when the IP data is transmitted by an SDH network.

2. Description of the Related Art

A high order path capacity in the SDH transmission system has been growing with developments of transmission technology, and increased capacity of a transmission signal (payload). Specifically, from VC-3 (Virtual Container, 48,384 kbps), and VC-4 (149,760 kbps) to VC-4-4c (599,040 kbps), VC-4-16c (2,396,160 kbps), VC-4-64c (9,584,640 kbps), VC-4-256c (38,338,560 kbps), etc. have been specified (refer to FIG. 1). Further, a virtual concatenated path transmission system has been developed, wherein a large-volume path signal is divided into a plurality of VC-3/VC-4 signals, transmitted, and restored to the original large-volume path signal at a receiving end (refer to related specifications, such as ITU-T Recommendation G.707 (00/10) and ITU-T Recommendation G.783 (01/1)).

According to this virtual concatenated path transmission system, large-volume data can be divided into 1 through 256 pieces of VC-3/4 data, enabling a transmission of the large-volume data, even if there is no large-capacity transmission-line of such as 10 G bps and 40 G bps available (refer to FIG. 2).

A virtual concatenated path transmission system divides a path container (C-3/4-Xc) into X pieces of VC-3 or VC-4 data, and transmits the pieces via a transmission line. Here, the value of X is set up beforehand by an operator according to data volume to transmit, and VC-3/VC-4path identification numbers used for the virtual connection must also be set up at both a transmitting apparatus and a receiving apparatus.

When the transmitting apparatus transmits a virtual concatenated path, a multi-framing number that is used to absorb a signal transfer-lag, and a sequence number that identifies a VC-3/VC-4 path are provided to the receiving apparatus, using an H4 byte in a path-overhead (POH) of each VC-3/VC-4 (Refer to FIG. 3). The receiving apparatus restores the path container (C-3/4-Xc) by arranging a plurality of received VC-3/VC-4 paths according to the sequence number, and by absorbing the signal transfer-lag of the paths by matching the multi-framing number of the H4 byte.

Here, an example is described. In the case that a signal to be transmitted by an SDH transmission line is a signal of Ethernet (registered trademark), and the like, the Ethernet (registered trademark) signal, unlike a conventional voice signal, tends to have an odd data volume, causing an inefficiency if a path container of SDH is to accommodate the Ethernet (registered trademark) signal. Rather than accommodating the Ethernet (registered trademark) signal in a conventional path container of an SDH transmission line, it is more advantageous in respect of efficiency to use the virtual concatenated (VC) path method that allows setting up a data transmission capacity per VC-3or VC-4. However, even if the virtual concatenated path method is used in an attempt to improve the efficiency, an operator is required to set up an X value on both transmitting side and receiving side, the X value being a number by which data to be transmitted is divided, and determined uniquely by a data volume to be transmitted.

Here, a feature of an Ethernet (registered trademark) signal is in that an amount of transmission traffic increases and decreases in time. In view of the feature, two methods of setting the X value are conceivable, namely:

(1) setting the X at a value smaller than a maximum signal capacity of the Ethernet (registered trademark) signal, and (2) setting the X at the maximum signal capacity of the Ethernet (registered trademark) signal.

The method (1) is an advantageous setting method in view of an efficient practical use of an SDH transmission line when usual traffic amount is low. Conversely, if the maximum signal capacity is required, some data will be discarded at an inputting stage to the SDH transmission line. On the other hand, if the setting method (2) is used, although the maximum signal capacity can always be offered, the maximum capacity may not always be used, resulting in useless capacity assigned, and an inefficiency of SDH transmission line usage.

For example, when actual traffic is 80 M bps for an Ethernet (registered trademark) signal capacity of 100 M bps (100 Base), since only a VC-3 (about 48 M bps) and a VC-4 (about 150 M bps are available in the conventional SDH transmission, a VC-4 is provided, resulting in applying the method of (2). The usual traffic is only 80 M bps in this case, resulting in a remaining capacity of about 70 M bps that is assigned uselessly. If the method (1) is applied, two VC-3 paths, also expressed as VC-3-2v and VC-3×2, will be assigned, which provide a suitable capacity for the actual traffic. However, when traffic demand reaches the maximum capacity of 100 M bps, since the capacity of VC-3-2v is 48×2=about 96 M bps, there is an insufficiency of 4 M bps, leaving part of data discarded.

SUMMARY OF THE INVENTION

Accordingly, it is a general object of the present invention to provide a path control method that adjusts a capacity of an SDH transmission line on a real-time basis, according to changes in traffic amount inputted into a transmitting apparatus.

It is another and more specific object of the present invention to provide the path control method that makes it possible to continue data transmission, while adjusting the capacity of the transmission line suitably by performing-a sequence of capacity adjustments between the transmitting apparatus and a receiving apparatus, without producing a loss of data, and without an operator intervening.

In order to achieve the above objects, the present invention provides an extra path that is additionally assigned to a virtual concatenated path, and detached from the virtual concatenated path, in a synchronous digital transmission system, wherein a signal with variable traffic is divided into two or more virtual concatenated paths.

Other objects and further features of the present invention will be apparent from the following detailed description when read in conjunction with the accompanying drawings.

By configuring in this manner, there is no need for preparing virtual concatenated paths beforehand that meet the maximum traffic capacity for a transmitting apparatus and a receiving apparatus concerned. Rather, an increase in the traffic amount in burst can be accommodated by the extra path. Accordingly, while the traffic amount is less than the maximum capacity, only a capacity sufficient to carry actual traffic is provided, without using the extra path. The extra path can be diverted to other use, such as data transmission of other apparatuses, contributing to improve usage efficiency of the transmission line (transmission path resources). When the maximum traffic capacity is required, the extra path can be used, avoiding an occurrence of data discarding.

In order to achieve this, change of the number of virtual concatenated paths actually used is automatically controlled by performing a predetermined sequence by the transmission apparatus and the receiving apparatus. By configuring in this manner, quick change of a transmission capacity in response to traffic change becomes possible, since a necessary process is performed in a lower layer than when an operator has to change settings.

Further, it is desirable that an extra path can be assigned selectively to an uplink and a downlink, corresponding to live data amounts. In this manner, an efficient use of the extra path can be provided, even if traffic of the uplink and traffic of the downlink are not balanced.

Further, it is desirable that the extra path is available to a plurality of groups of a plurality of virtual concatenated paths such that the extra path is efficiently used when peak traffic takes place at one of the groups of the virtual concatenated paths.

A priority may be assigned to each group of the virtual concatenated paths, according to which the extra path is assigned. The priority may be defined on a service type basis.

BRIEF DESCRIPTION OF THE DRAWINGS

FIG. 1 is a figure showing an example of a standard format of a virtual concatenated path signal (high order path signal) which can be used in a virtual concatenated path transmission system;

FIG. 2 is a figure that explains an outline of a signal transmission by the virtual concatenated path transmission system;

FIG. 3 is a figure that explains an example of use of an H4 byte (for multi-framing identification) in the virtual concatenated path transmission system;

FIG. 13 is a figure for explaining operation of an information area of transmitted/received signals when a sequence message is exchanged between a transmitting apparatus and a receiving apparatus, the sequence being executed according to FIG. 8;

FIG. 14 is a figure for explaining the concept of the second embodiment of the present invention;

DESCRIPTION OF THE PREFERRED EMBODIMENTS

In the following, embodiments of the present invention will be described with reference to the accompanying drawings.

A first embodiment of the present invention is explained, referring to appended drawings.

Figure 4:
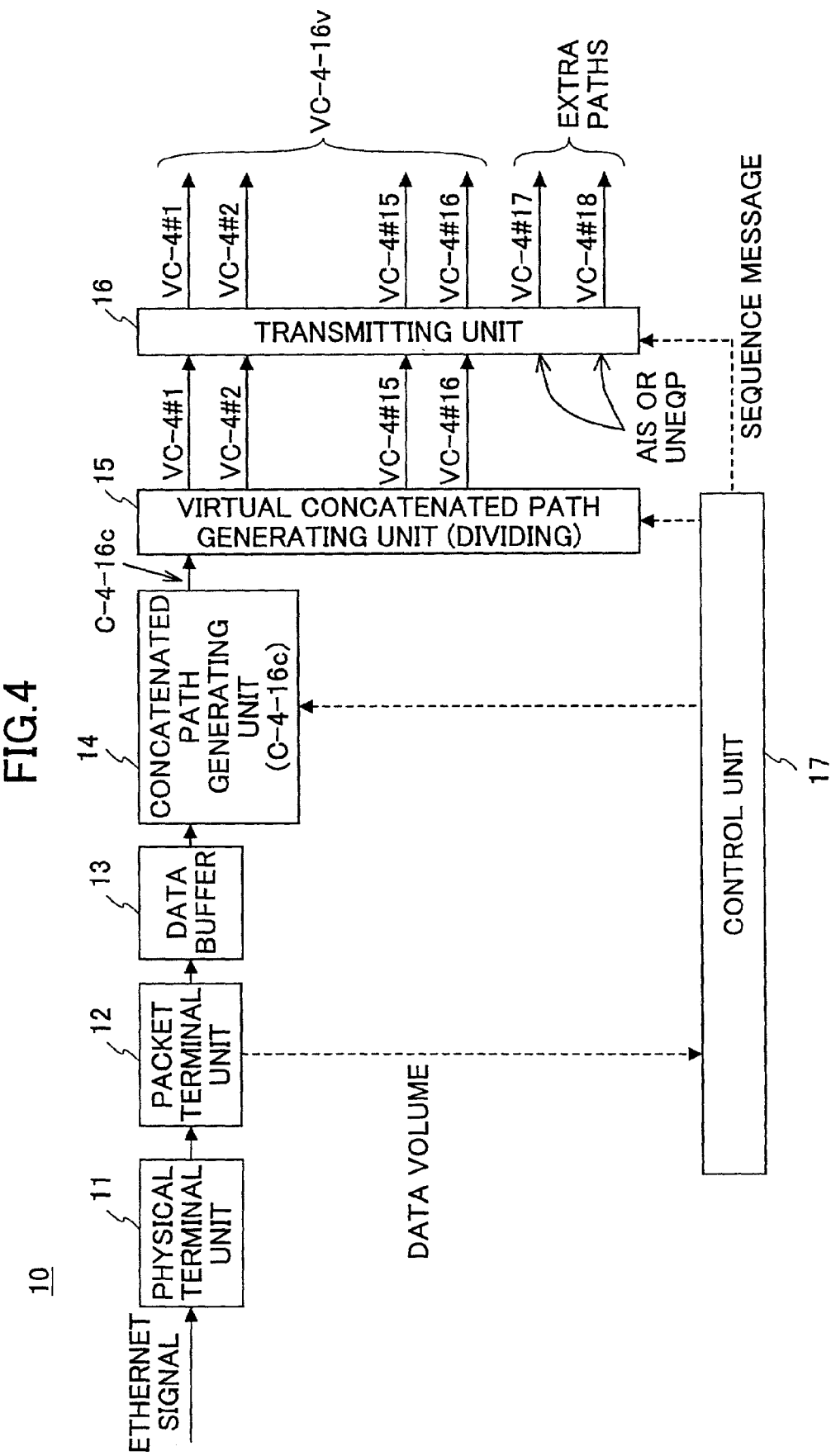
FIG. 4 is a block diagram showing a configuration of a transmitting apparatus of a data transmission system of a first embodiment of the present invention.

This embodiment is an example of transmitting an Ethernet (registered trademark) signal, which is inputted to a transmitting apparatus, by VC-4-Xc (X=16+α). FIG. 4 shows a configuration of the transmitting apparatus in usual operation, and FIG. 5 shows a configuration of the receiving apparatus in usual operation.

A transmitting apparatus 10 shown in FIG. 4 includes a physical terminal unit 11 to which an Ethernet (registered trademark) signal physically terminates, a packet terminal unit 12 that converts the physically terminated signal into packet data, a data buffer 13 that stores the obtained packet data temporarily, a concatenated path generating unit 14 that bundles the packet data by predetermined frames according to the virtual concatenated path method and converts into a path container format of C-4-16c, a virtual concatenated path generating unit 15 that divides the path container into a plurality (16, for example) of virtual concatenated paths (VC) and adds path overheads such as a J1 byte and an H4 byte, and a transmitting unit 16 that adds an SOH (section overhead) to the data divided into the 16 virtual concatenated paths and transmits to an SDH transmission line (optical-fiber transmission line) The transmitting apparatus 10 further includes a control unit 17 that performs the path control method of the present invention, while carrying out an overall control of the entire transmission apparatus 10.

Figure 5:
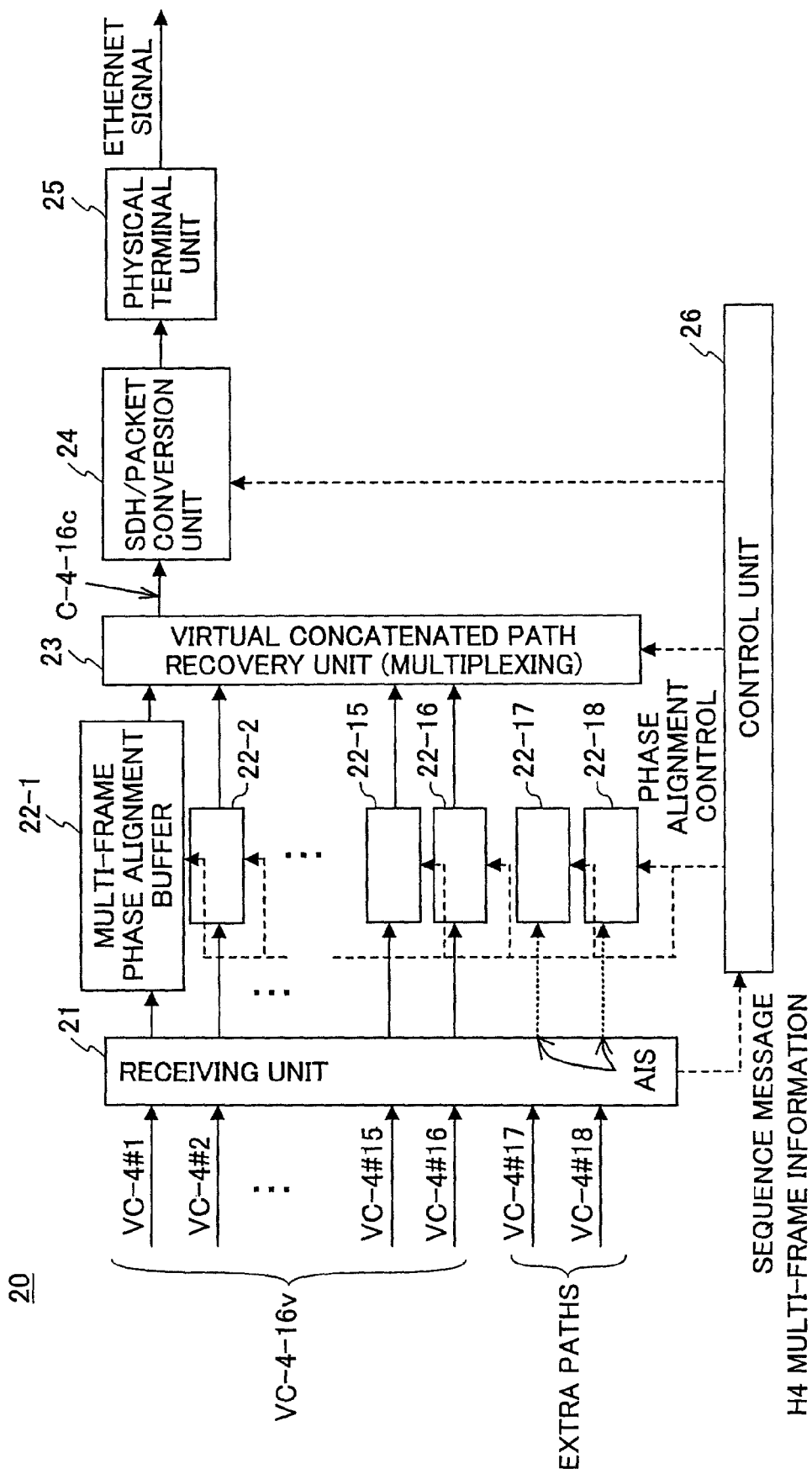
FIG. 5 is a block diagram showing a configuration of a receiving apparatus of the data transmission system of the first embodiment of the present invention.

A receiving apparatus 20 shown in FIG. 5 includes a receiving unit 21 that receives the data in the form of the plurality of virtual concatenated paths transmitted through the SDH transmission line, and terminates the data and the path overheads, 18 multi-frame phase alignment buffers marked as 22-1, 22-2, and so on up to 22-18 that are used when aligning multi-frame numbers by aligning frame timing of each path of the received data by control of a control unit 26, based on multi-frame information of the path overhead H4 acquired by the receiving unit 21, a virtual concatenated path restoration unit 23 that collects data in the virtual concatenated path format input with timing (phase) aligned, and recovers the original path container form, an SDH/packet conversion unit 24 that converts this data to the original packet data, and a physical terminal unit 25 that physically terminates the data and acquires the original Ethernet (registered trademark) signal. The receiving apparatus 20 further includes a control unit 26 that performs the path control method of the present invention, while carrying out an overall control of the entire receiver apparatus 20.

Here, both the transmitting apparatus 10 and the receiving apparatus 20 are installed in a communication terminal such that a bi-directional communication (exchange of a sequence message etc.) with a partner terminal is enabled.

In this embodiment, the number of the VC-4 paths is set at 16, as a default value, for both the transmitting apparatus 10 and the receiving apparatus 20, as shown in FIG. 4 and FIG. 5. Additionally, 2 VC-4paths are prepared as extra paths (VC-4#17, and VC-4#18 in FIG. 4 and FIG. 5) so that increased data traffic may be accommodated. As a default status, an AIS or UNEQP signal is inserted to the extra paths by the control unit 17. Further, the AIS signal and the like are inserted in the buffers 22-17 and 22-18 that correspond to the extra paths by the control unit 26.

Usually, i.e., in the default status, an Ethernet (registered trademark) signal is inserted into a path container of C-4-16c, and divided into virtual concatenated paths, and transmitted via 16 paths VC-4#1 through VC-4#16 by the transmitting apparatus 10. The control unit 17 monitors a traffic amount (the amount of live data) of the Ethernet (registered trademark) signal in the packet terminal unit 12 of the transmitting apparatus 10. Specifically, the traffic amount is based on the number of packets generated, and in the case of a variable-length packet, information relative to packet length is additionally monitored. On the side of the receiving apparatus 20, the C-4-16c is restored by multiplexing the virtual concatenated paths, after aligning phases of the 16 paths, treating the 16 paths of VC-4#1 through VC-4#16 in the buffers 22-1 through 22-16, respectively, as a virtual concatenated path in the default status, as shown in FIG. 5

Figure 6:
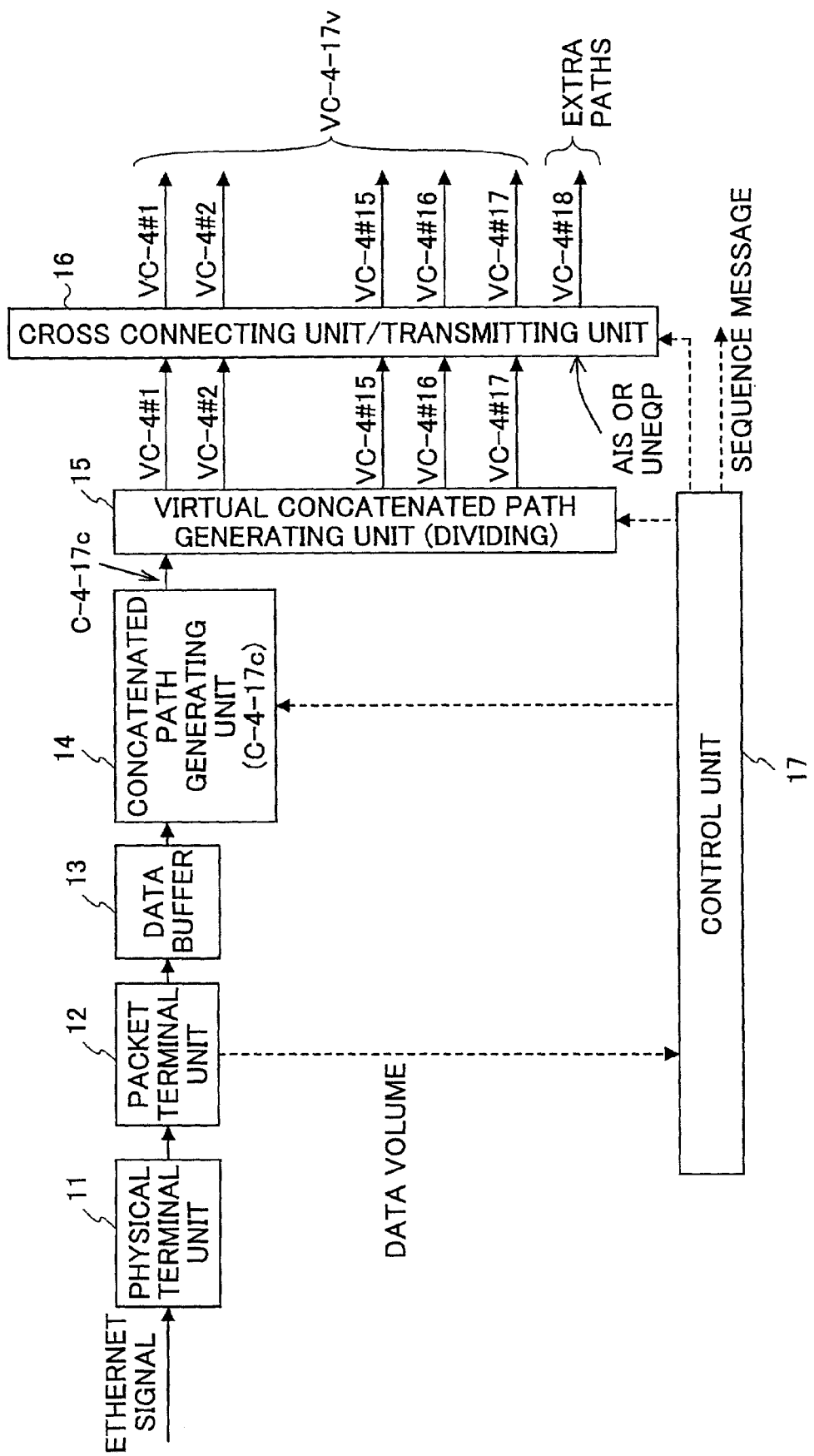
FIG. 6 is a figure explaining a status of the transmitting apparatus shown in FIG. 4 when traffic increases.

Next, the case where the traffic amount (amount of live data) of the Ethernet (registered trademark) signal increases is explained. As mentioned above, the control unit 17 keeps monitoring the traffic amount of the packet terminal unit 12 of the transmitting apparatus 10. When the control unit 17 determines that "traffic increases", the concatenated path generating unit 14 and the virtual concatenated path generating unit 15 are directed such that an extra path, e.g., VC-4#17 is engaged, leaving the VC-4#18 as an extra path still available. FIG. 6 shows the state of the transmitting apparatus 10 in this case.

Figure 7:
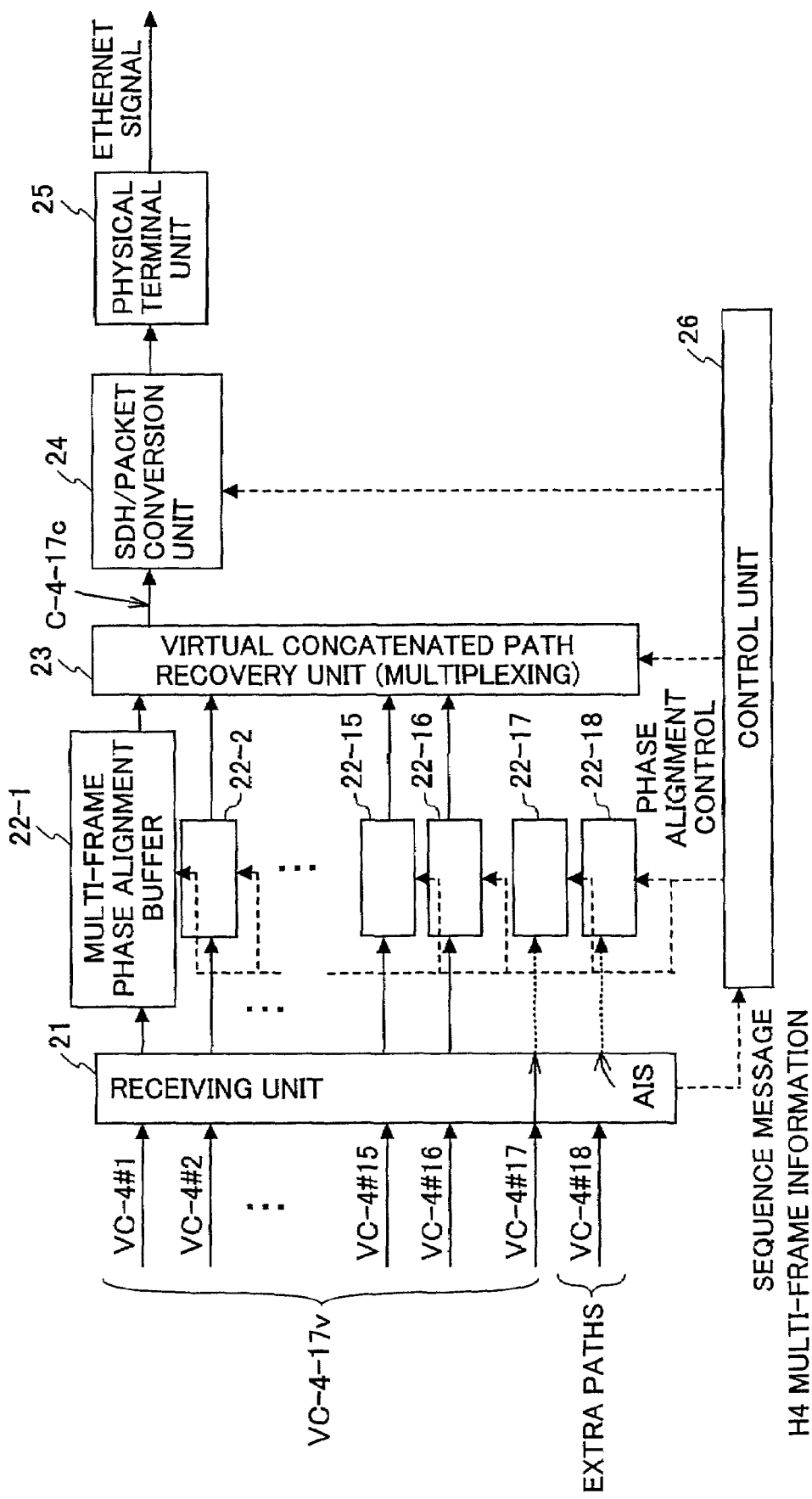
FIG. 7 is a figure explaining a status of the receiving apparatus shown in FIG. 5 when traffic increases.

On the side of the receiving apparatus 20, the added path VC-4#17 is joined to the 16 default paths. Then, all the 17 paths are processed such that the concatenated path is recovered, and then, the Ethernet (registered trademark) signal is recovered, without having to discard the increased traffic, as shown in FIG. 7.

Here, the transmitting apparatus 10 and the receiving apparatus 20 must be synchronized when changing the number of the virtual concatenated paths, failing which, a data error or discarding may occur. In order to prevent the problem from occurring, the present invention provides a procedure (sequence) that is executed by the transmitting apparatus 10 and the receiving apparatus 20 such that the change takes place simultaneously, assuring divided and transmitted data to be correctly received and recovered.

Figure 8:
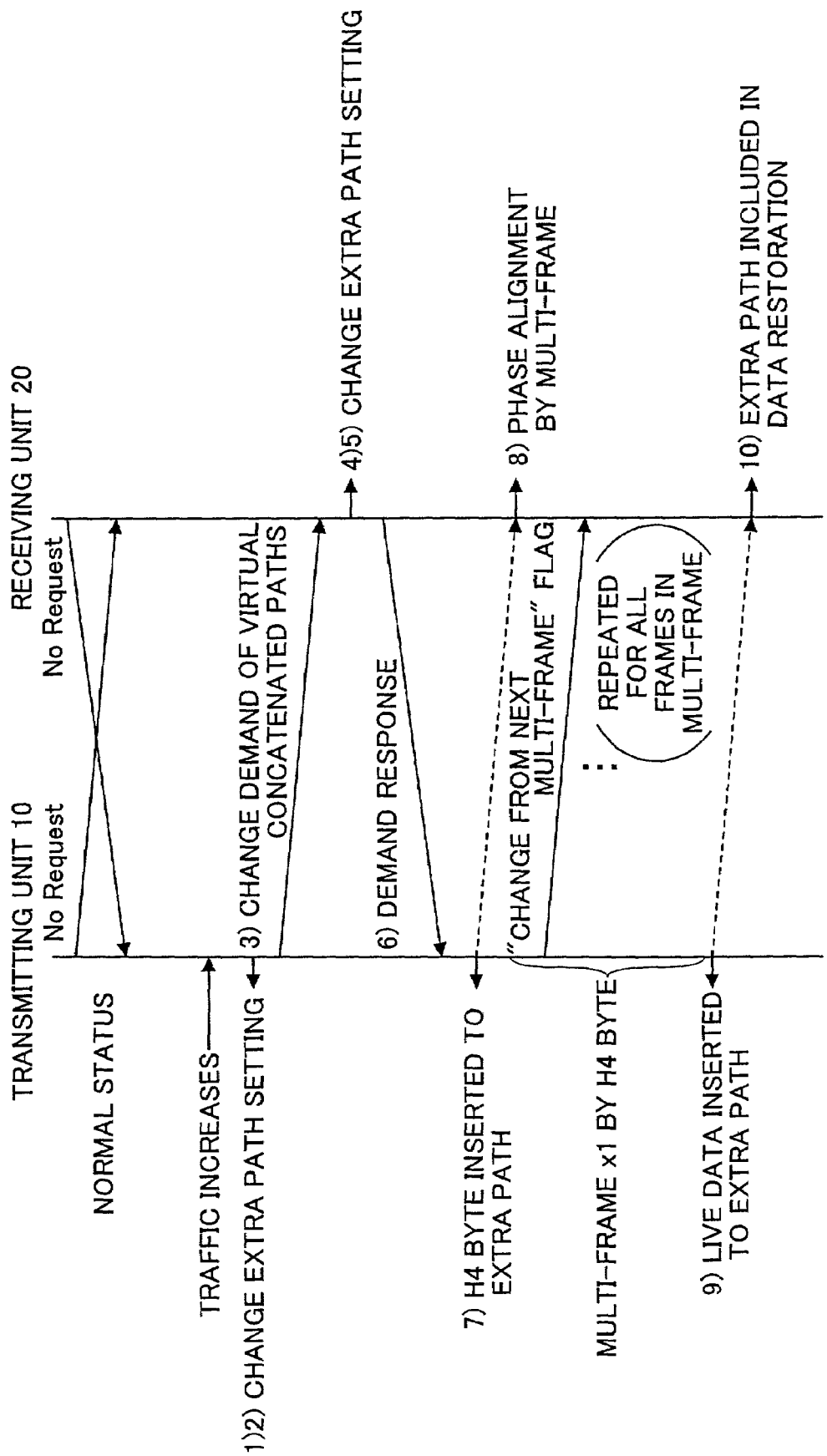
FIG. 8 is a figure explaining an example of a sequence that changes the number of virtual concatenated paths of the path transmission system of the first embodiment of the present invention.
Figure 9:
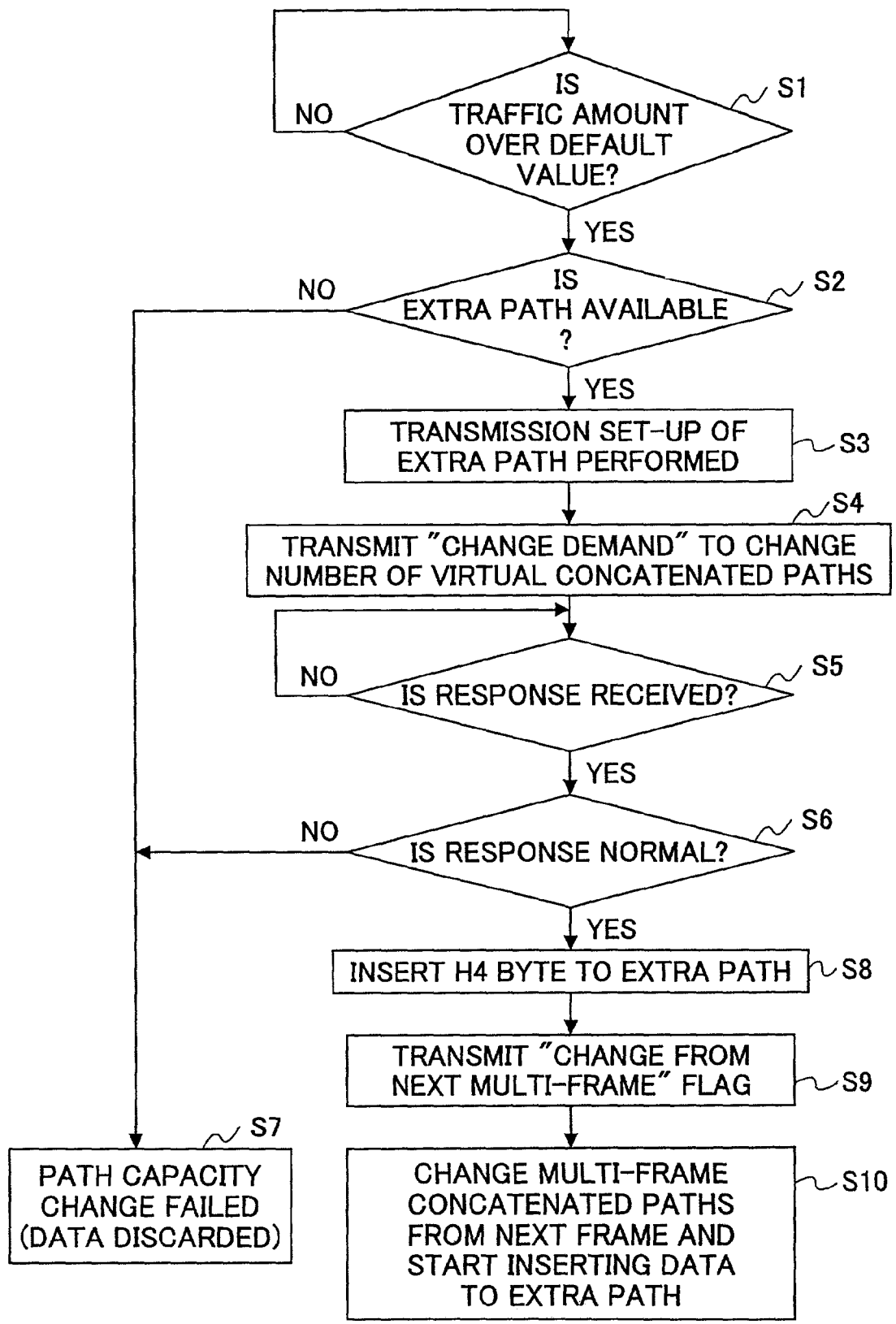
FIG. 9 is a flowchart that shows an example of sequence operation on a transmitting side, which changes the number of virtual concatenated paths when traffic increases in the path transmission system of the first embodiment of the present invention.
Figure 10:
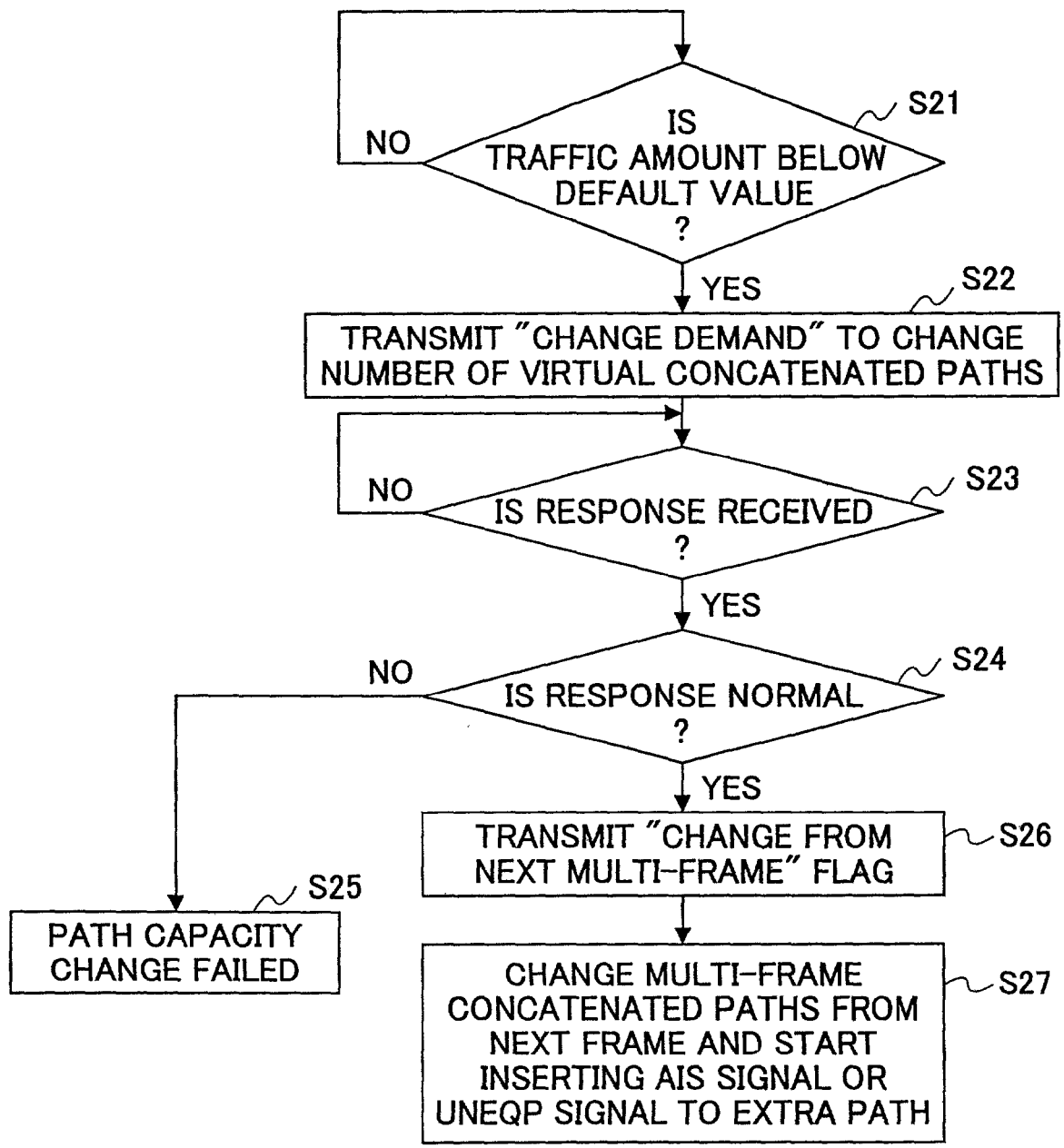
FIG. 10 is a flowchart that shows an example of the sequence operation on the transmitting side, which changes the number of virtual concatenated paths when traffic decreases in the path transmission system of the first embodiment of the present invention.
Figure 11:
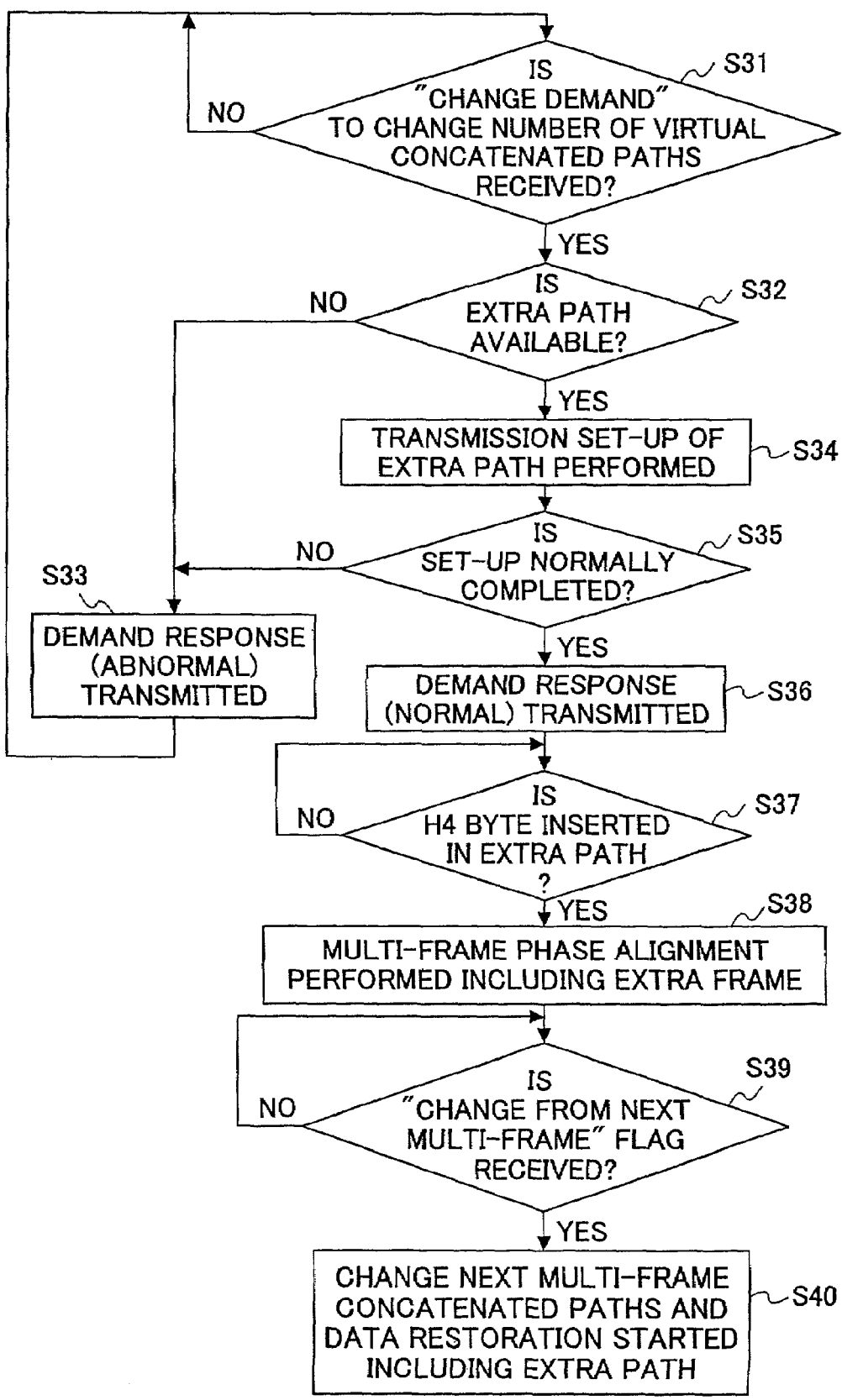
FIG. 11 is a flowchart that shows an example of receiving-side operation of the sequence that changes the number of virtual concatenated paths when traffic increases in the path transmission system of the first embodiment of the present invention.
Figure 12:
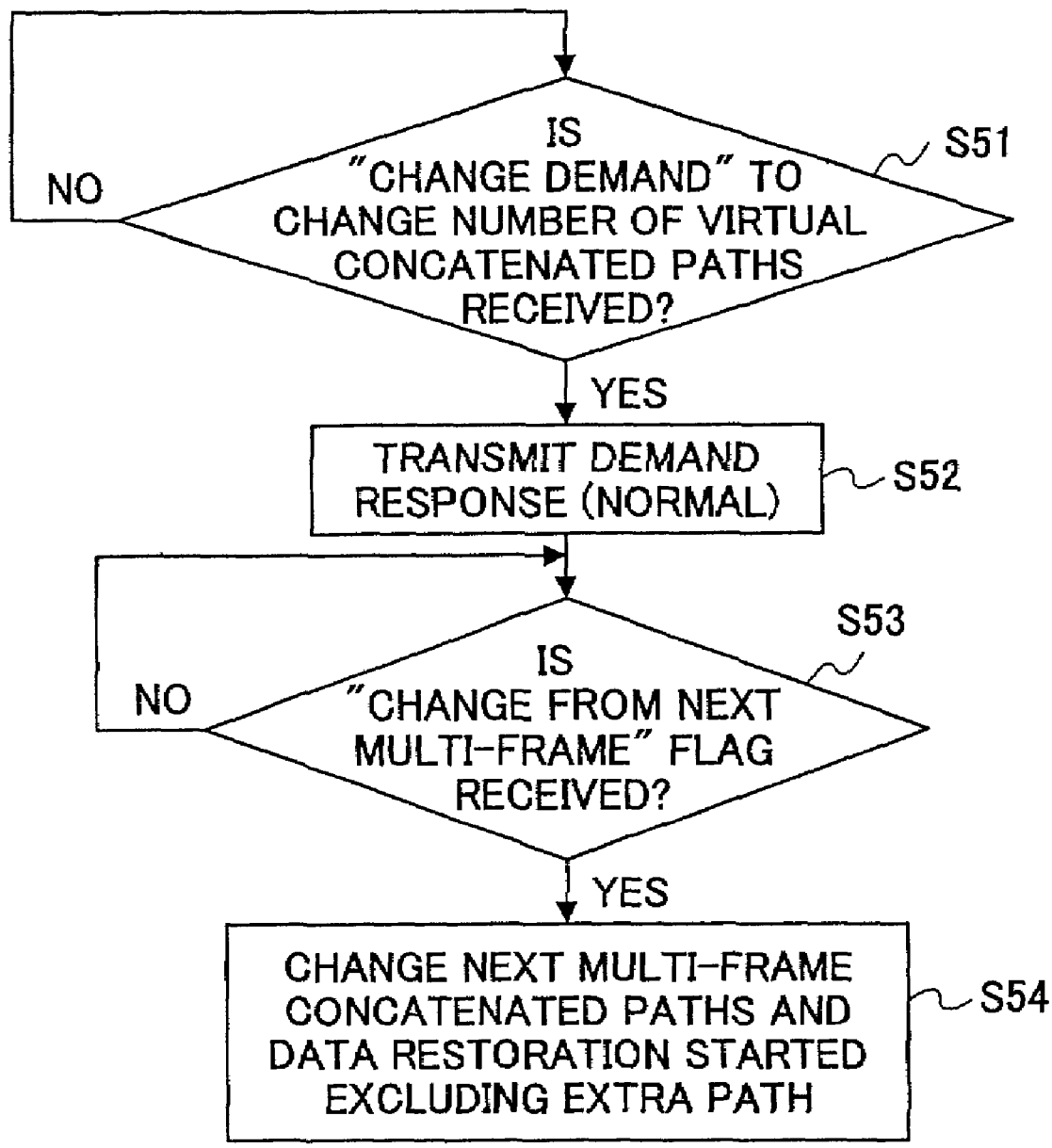
FIG. 12 is a flowchart that shows an example of receiving-side operation of the sequence that changes the number of virtual concatenated paths when traffic decreases in the path transmission system of the first embodiment of the present invention.

The details of this sequence (procedure) are shown in FIG. 8, and a flow of operation of the transmitting apparatus 10 when adding an extra path to meet the traffic increase is shown in FIG. 9. Further, a flow of operation of the transmitting apparatus 10 when returning to the default status, pursuant to a traffic decrease is shown in FIG. 10. A flow of operation of the receiving apparatus 20 when the traffic increases is shown in FIG. 11, and, similarly a flow of operation when the traffic decreases is shown in FIG. 12. Hereafter, when a step number of a flowchart is described, the word "step" may be omitted and only S1, S2 and the like may appear.

First, whether a traffic amount is above or below a default value is checked (S1, S21).

1) If it is determined that the traffic amount is "above" the default value, whether an extra path is available to the transmitting apparatus 10 is checked (S2).

2) If an extra path is available, the extra path is set up (cross-connected) by the transmitting apparatus 10 (S3).

At this time, a content of the extra path remains "unused", that is, all bits of an AU-AIS or C2 byte of POH (path overhead) are set at "0" (UNEQP).

3) Next, the transmitting apparatus 10 transmits a "change demand" to the receiving apparatus 20 such that the number of virtual concatenated paths is changed (S4, S22).

Here, the "change demand" to change the number of virtual concatenated paths includes following information:

(1) Demand path number: identification information of a virtual concatenated path that demands the change, (2) Increase/decrease identification code: a code that discriminates whether the change demand is an increase demand or a decrease demand, (3) The number of paths demanded: quantity information as to how many paths are to be increased/decreased in terms of the number of VC-3paths or VC-4 paths, and (4) Increase/decrease path number: identification information, indicating which extra paths are to be increased/decreased where a plurality of extra paths are available.

In this embodiment, these pieces of information are included in a J1 byte as shown in FIG. 13. However, any other unused byte in POH can be used for this purpose.

4) When the receiving apparatus 20 receives from transmitting apparatus 10 a "change demand" to change the number of virtual concatenated paths (YES at S31 and S51), a content of the demand is checked. If the content indicates "above" the default value, that is, an increase in traffic capacity is demanded, a status of extra paths of the receiving apparatus 20 is checked (S32).

5) If an extra path is available, the receiving apparatus 20 sets up the extra path (crossing connection) as demanded (S34).

At this time, the extra path is not joined yet to the virtual concatenated paths, but rather the path is treated as "unused", in the case of increasing the capacity. Conversely, in the case of decreasing the capacity, the extra path in use remains joined in the virtual concatenated paths.

6) The receiving apparatus 20 transmits a "demand response" to the transmitting apparatus 10 (S36, S52).

The "demand response" includes following information:

(1) Demand path number: identification information of the virtual concatenated path for which the change demand is issued, which is the same as what is received, (2) Response to the change demand: results of a checking/changing in the receiving apparatus 20:

Normal,

Abnormal,

Demand NG: The change demand content is not sufficient or illegal,

Extra path NG: An extra path fails, and

Set-up NG: Set-up (cross connection) of an extra path fails.

The above pieces of information may be transmitted by using, e.g., a J1 byte of the path overhead (POH) of the path signal, as shown in FIG. 13.

7) If the transmitting apparatus 10 receives a "normal" response from the receiving apparatus 20 (YES at S6 and S24), the following process is performed.

If the number of the virtual concatenated paths is to be increased, a multi-framing number and a sequence number are inserted in the H4 byte of the extra path (S8).

At this time, live data is not yet inserted into the extra path.

Conversely, if the number of the virtual concatenated paths is to be decreased, the process progresses to S9.

8) The receiving apparatus 20 performs as follows.

If the number of the virtual concatenated paths is to be increased, a phase of the extra path is aligned with present virtual concatenated paths, using a multi-framing number indicated by the H4 byte of the extra path.

At this time, since there are no live data inserted in the extra path, the extra path is not used in a restoration (multiplex) process of a virtual concatenated path.

Conversely, if the number of the virtual concatenated paths is to be decreased, the process progresses to S10.

9) The transmitting apparatus 10 transmits a "change from next multi-frame" flag (S9), indicating that the number of the concatenated paths is changed from the first frame of the next multi-frame, if the flag is "1". The "change from next multi-frame" flag is set up in one of vacant bit spaces, for example, Bit 1 of the H4 byte of the second frame in FIG. 3. Then, the following process is performed.

If the number of the virtual concatenated paths is to be increased, inserting live data to the extra path is started (S10).

Conversely, if the number of the virtual concatenated paths is to be decreased, inserting an UNEQP signal or all-"1" data to the extra path is started (S27).

10) When the receiving apparatus 20 receives the "change from the next multi-frame" flag by the H4 byte (YES at S37 and S53), the number of the virtual concatenated paths is changed from the first frame of the next multi-frame (S38-S39), and the following process is performed.

If the number of the virtual concatenated paths is to be increased, restoration now includes the extra path (S40).

Conversely, if the number of the virtual concatenated paths is to be decreased, the extra path is put into an "unused" status and the restoration is performed to remaining concatenated paths (S54).

Time required to exchange the sequence message, as shown in FIG. 8, between the transmission apparatus 10 and the receiving apparatus 20 is about one second at the maximum, which compares with a manual operation, likely taking tens of seconds. By providing the automatic setting at the lower layer, setting time is saved, error occurrence is eliminated, an immediate compliance to traffic variation is possible, and, as a result, an efficient path control is realized.

Here, the change of the number of the concatenated paths by the sequence is performed to an uplink and a downlink, selectively, such that traffic status in each direction is properly reflected in configuring the transmission paths. In this manner, a higher efficiency of the transmission usage is attained.

Next, the second embodiment of the present invention is explained.

In the second embodiment, one or more extra paths are shared by two or more virtual concatenated paths between the same two nodes. Concept of this system is explained, using FIG. 14. In FIG. 14, two Ethernet (registered trademark) signals (A) and (B) are transmitted from a node (4) to a node (2). Suppose a total of 24 VC-4 paths are required by (A) and (B), i.e., 18 VC-4 and 6 VC-4, respectively, to meet each maximum capacity in a conventional system. The present embodiment provides a total of 22 VC-4 paths, i.e., 16 VC-4 and 4 VC-4 paths to (A) and (B), respectively, and two VC-4 extra paths. The extra paths (VC-4×2) are to be shared by virtual concatenated paths (A) and (B). In this manner, efficiency of path usage is enhanced without causing data discarding when data traffic increases.

Figure 15:
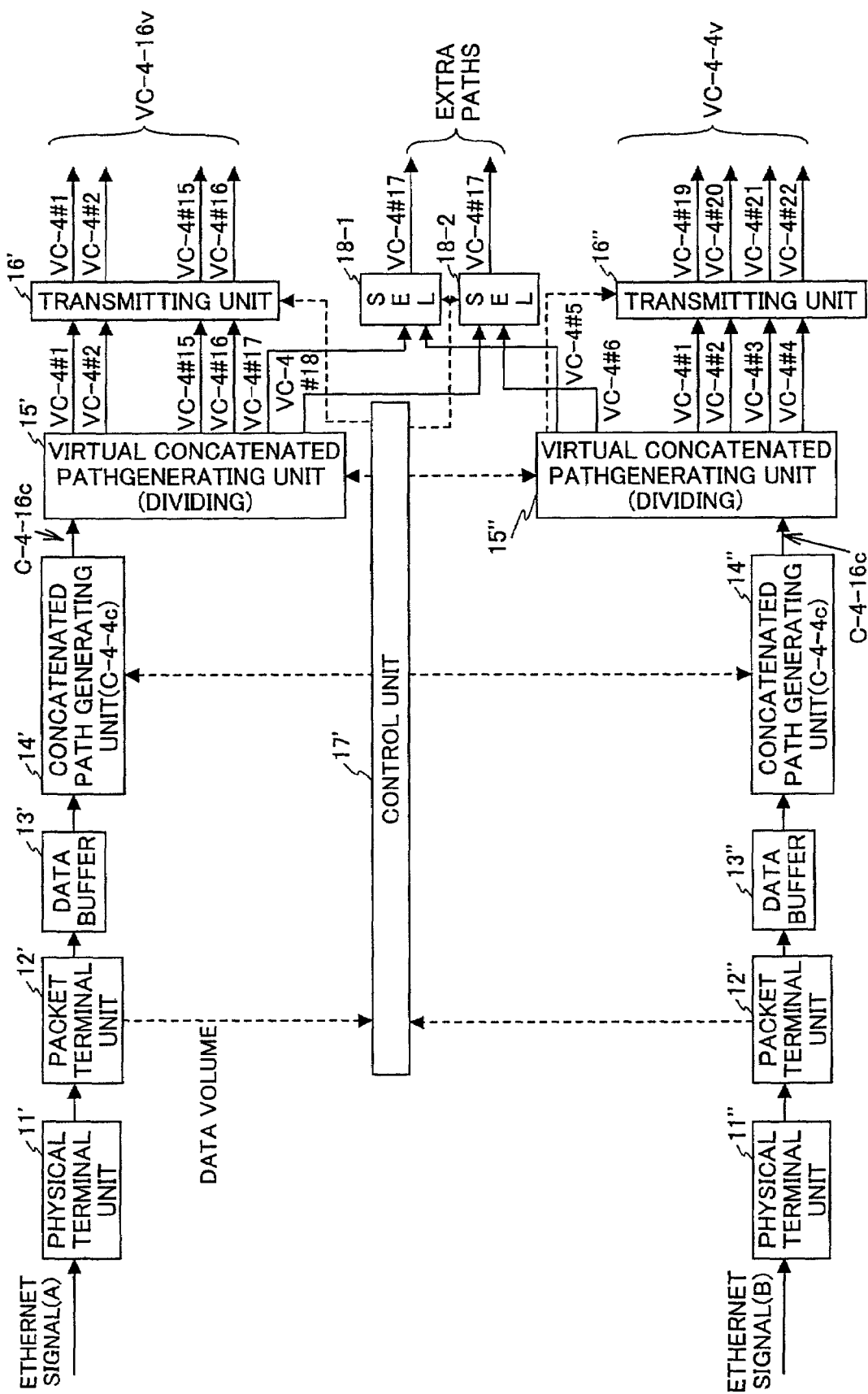
FIG. 15 is a block diagram showing an example of a transmitting apparatus of the data transmission method of the second embodiment of the present invention.
Figure 16:
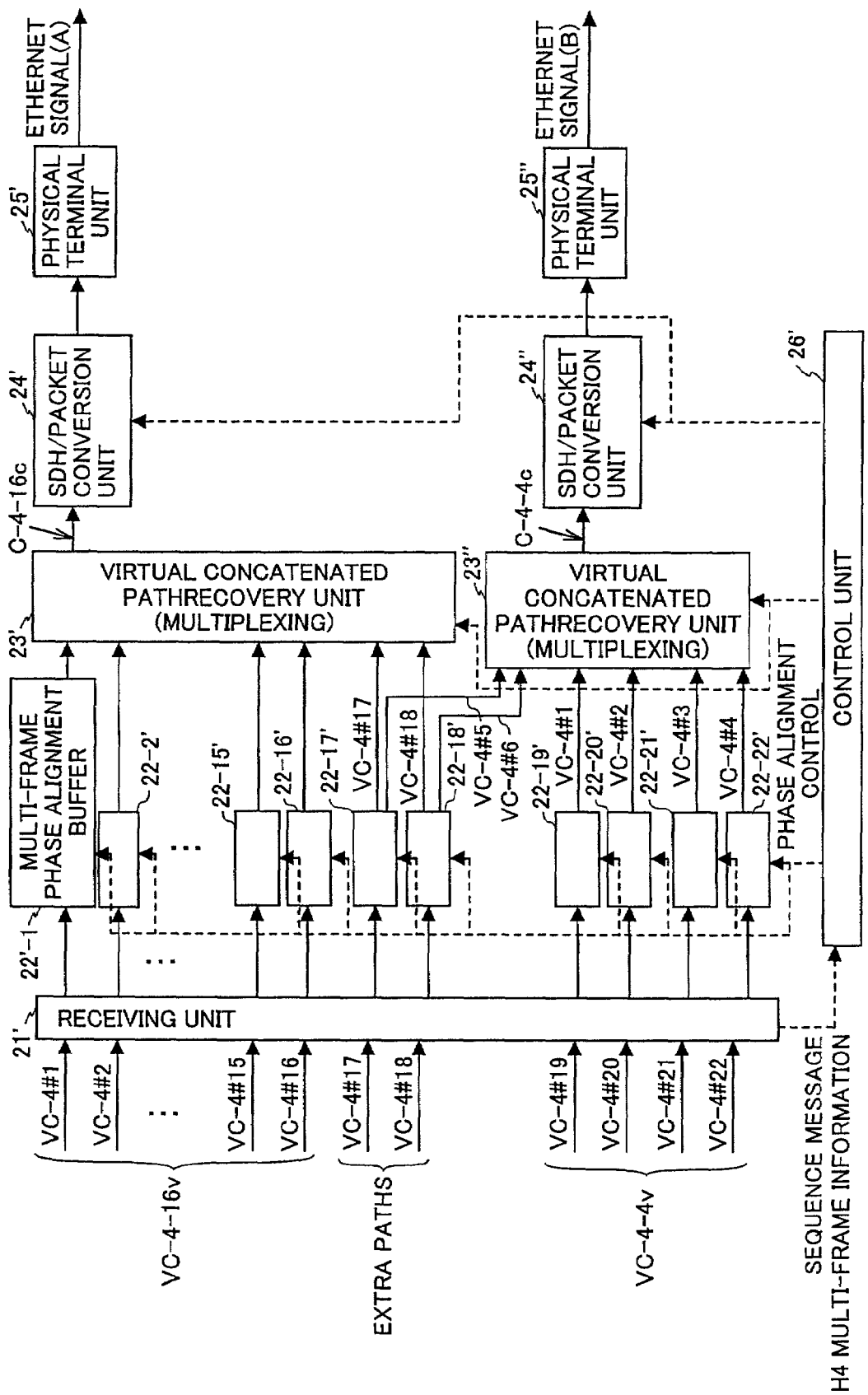
FIG. 16 is a block diagram showing an example of a receiving apparatus of the data transmission method of the second embodiment of the present invention.

FIG. 15 shows a configuration of a transmitting apparatus of the second embodiment, wherein one or more extra paths are shared. FIG. 16 shows a configuration of a corresponding receiving apparatus. To components that correspond to those in FIG. 4 and FIG. 5, a quotation mark (") is attached.

In the second embodiment, two virtual concatenated paths (A) and (B) share two extra paths (VC-4#17 and VC-4#18). By sharing the extra paths, when a traffic amount of an Ethernet (registered trademark) signal (A) in FIG. 15 is modest, i.e., less than a default value, and a traffic amount of an Ethernet-(registered trademark) signal (B) becomes high, namely, a path container of C-4-4c (about 600 M bps) becomes no longer sufficient, the extra paths are joined to virtual concatenated paths of the Ethernet (registered trademark) signal (B). When the traffic amount of the Ethernet (registered trademark) signal (B) returns to a modest status, the extra paths are freed. Afterwards, when a traffic amount of the Ethernet (registered trademark) signal (A) exceeds a capacity of C-4-16c (about 2.4 G bps, the extra paths are joined to virtual concatenated paths of the Ethernet (registered trademark) signal (A). In this manner, the extra paths are used by a signal of which traffic amount temporarily increases, enhancing an accommodation efficiency of an SDH transmission line.

Further, in the second embodiment, a priority can be assigned to the two virtual concatenated paths. For example, a higher priority is assigned to the signal (A), and a lower priority to the signal (B). In this case, when the traffic amount of the signal (A) becomes high while the signal (B) is using the extra path, the signal (B) is deprived of the extra paths, which are assigned to the signal (A) that has the higher priority. The above configuration is effective where priorities are assigned to each of Ethernet (registered trademark) signals accommodated in an SDH transmission line.

The second embodiment can also be configured such that an extra path is assigned on a first-come-first-served basis. A late comer has to wait until the extra path is released. Data that exceeds a transmission capacity may be stored in a data buffer until the extra path becomes available.

A sequence message, such as shown FIG. 8, of each of the first embodiment and the second embodiment can be exchanged by using the J1 byte in the path overhead. Although FIG. 13 shows an example of the sequence message when the J1 byte is used, the sequence message may use any other available bytes, such as an N1 byte and other unused bytes in POH.

Further, even if the J1 byte and the like are used by a 64-multi-frame for hitless path switching, it is possible to transmit and receive the sequence message of the present invention using an unused byte in the 64-multi-frame.

Further, it is also possible to transmit and receive the sequence message of the first embodiment and the second embodiment by an unused bit of the multi-frame of the H4 byte.

Further, a configuration of the first embodiment and the second embodiment can be such that an operator manually performs various set-ups to make the VC-4#17 and VC-4#18 the extra paths.

Figure 17:
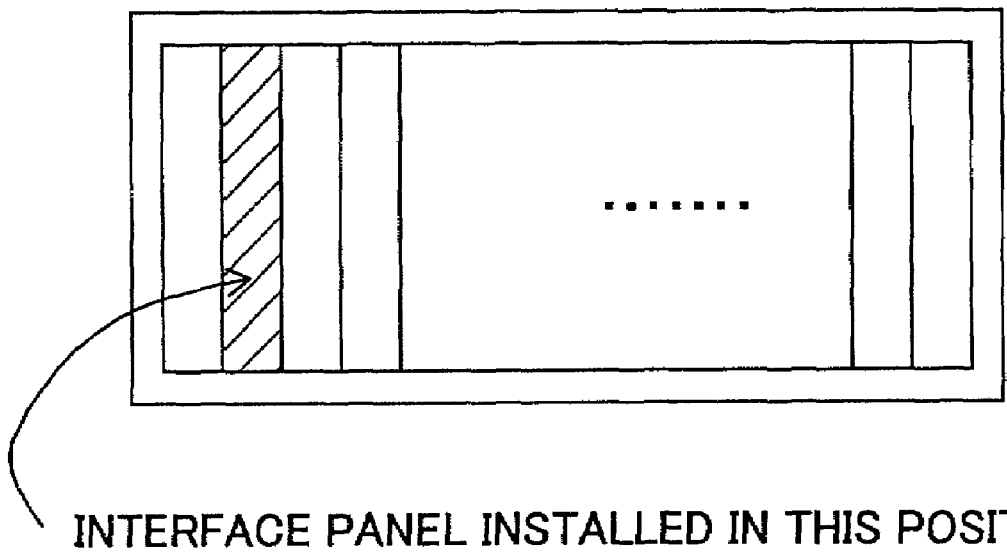
FIG. 17 is a figure for explaining an example of a method of an extra path setup in the path control method of the present invention.
Figure 18:
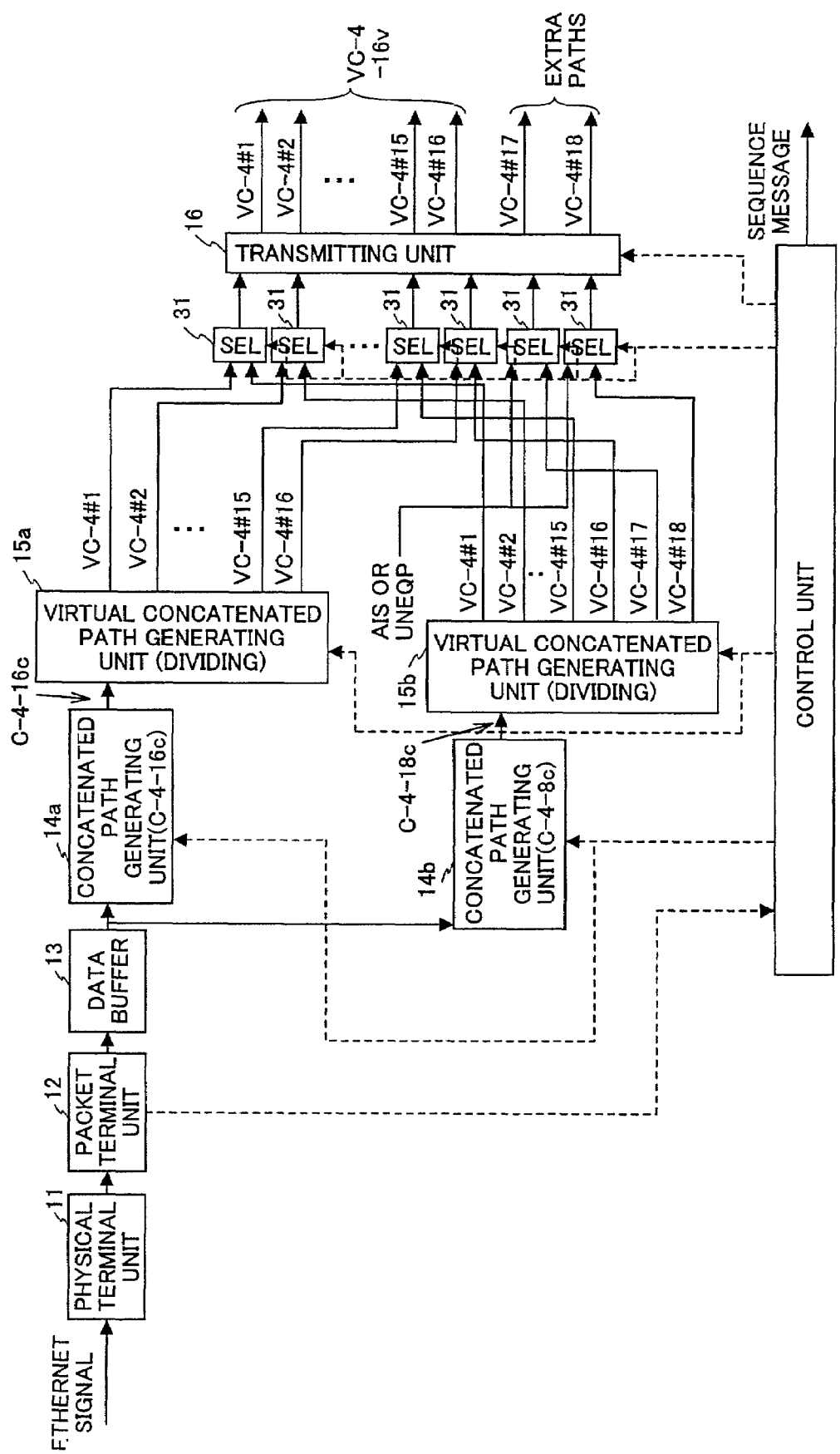
FIG. 18 is a block diagram for explaining a configuration of a transmitting apparatus of a variation applicable to each of the first and the second embodiments of the present invention.

The first embodiment and the second embodiment can also be structured such that an installation position of an interface panel for processing an Ethernet (registered trademark) signal uniquely defines an extra path (refer to FIG. 17). In this case, the extra path is automatically defined, and the path control operation of the present invention is performed without an operator's intervention.

Figure 19:
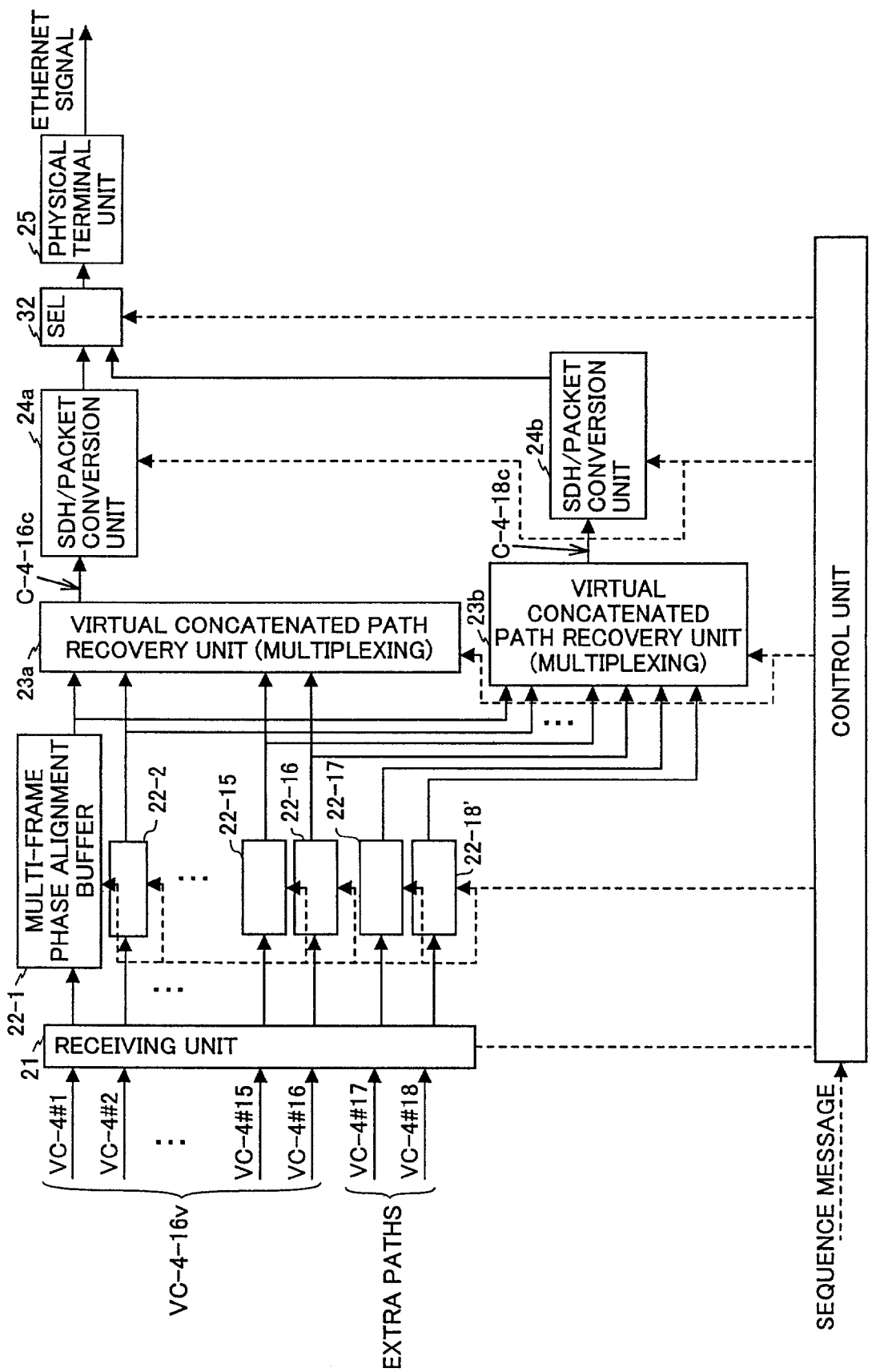
FIG. 19 is a block diagram for explaining a configuration of a receiving apparatus of a variation applicable to each of the first embodiment and the second embodiment of the present invention.

Further, the first embodiment and the second embodiment can be structured as follows. The concatenated path generating unit 14 is divided into a concatenated path generating unit for default paths 14a and a concatenated path generating unit for extra paths 14b, and the virtual concatenated path generating unit 15 is divided into a virtual concatenated path generating unit for default paths 15a, and a virtual concatenated path generating unit for extra paths 15b in the transmitting apparatus. Similarly, on the receiving apparatus side, the virtual concatenated path restoration unit 23 is divided into a virtual concatenated path restoration unit for default paths 23a and a virtual concatenated path restoration unit for extra paths 23b, and the SDH/packet conversion unit 24 is divided into an SDH/packet conversion unit for default paths 24a and an SDH/packet conversion unit for extra paths 24b as shown in FIG. 19. In this manner, the number of the concatenated paths can be changed by switching selectors 31 and 32 at a later stage. This configuration dispenses with a need to provide a different clock speed to each of above units. (In the case of FIGS. 4, 5, 6 and 7, different clock frequencies have to be provided to the concatenated path generating unit 14, the virtual concatenated path generating unit 15, the virtual concatenated path restoring unit 23 and the SDH/packet conversion unit 24, according to whether or not an extra path is engaged.)

In this manner, the present invention enhances efficiency of transmission line resources using a virtual concatenated path, enabling an adaptive arrangement of the transmission resources, without accompanying data discarding and error occurring when data traffic increases.

Further, the present invention is not limited to these embodiments, but various variations and modifications may be made without departing from the scope of the present invention.

The present application is based on Japanese priority application No. 2001-264704 filed on Aug. 31, 2001 with the Japanese Patent Office, the entire contents of which are hereby incorporated by reference.

What is claimed is:

1. A data transmission apparatus that transmits a data-speed-variable signal to a synchronous digital network by dividing the signal into a plurality of virtual concatenated paths, comprising a transmitting unit that engages one or more extra paths in addition to one or more virtual concatenated paths normally assigned when a traffic amount becomes high, and disengaging the one or more extra paths when the traffic amount resumes later, wherein
the one or more extra paths are distinguished from other paths by insertion of one of an AIS signal and an UNEOP sianal, and
an H4 byte is inserted to inform a receiving side of the creation of the one or more extra paths.

2. The data transmission apparatus as claimed in claim 1, wherein an addition and a detachment of the extra pats are automatically performed by a sequence.

3. The data transmission apparatus as claimed in claim 1, wherein an addition and a detachment of te extra paths in a transmitting direction are performed independently of an addition and a detachment of the extra paths in a receiving direction.

4. The data transmission apparatus as claimed in claim 1, wherein the extra paths are available to a plurality of groups of the virtual concatenated paths.

5. The data transmission appatatus as claimed in claim 4, wherein a. priority is assigned to one or more of the groups of the virtual concatenated paths.

6. The data transmission apparatus as claimed in claim 5, wherein the extra paths available to the plurality of the groups of the virtual concatenated paths are assigned on a first-come-first-served basis.

7. The data transmission apparatus as claimed in claim 2, wherein the sequence that adds and detaches the extra paths uses a J1 byte of a path overhead of a signal transmitted and received.

8. The data transmission apparatus as claimed in claim 2, wherein the sequence that adds and detaches the extra paths uses an unused byte of a path overhead of a signal included in a multi-frame.

9. The data transmission apparatus as claimed in claim 2, wherein the sequence that adds and detaches the extra paths uses an unused bit of an H4 byte of a path overhead of a signal included in a multi-frame.

10. The data transmission apparatus as claimed in claim 1, wherein the extra paths are set up by a network operator.

11. The data transmssion apparatus as claimed in claim 1, wherein the extra paths are uniquely defined by an installation position of an interface panel.

12. The data transmission apparatus as claimed in claim 1, wherein processing units used when an extra path is not used are provided separately from processing units used when an extra path is used, which are selected by a selector accordingly.

13. A path control method of data transmission that transmits a data-speed-variable signal to a synchronous digital network by dividing the signal into a plurality of virtual concatenated paths, wherein a transmitting unit engages one or more extra paths in addition to one or more virtual concatenated paths normally assigned when a traffic amount becomes high, and disengaging the one or more extra paths when the traffic amount resumes later, wherein
the one or more extra paths are distinguished from other paths by insertion of one of an ASI signal and an UNEOP signal, and
an H4 byte is inserted to inform a receiving side of the creation of the one or more extra paths.

14. The path control method as claimed in claim 13, wherein an addition and a detachment of the extra paths is automatically performed by a sequence.

15. The path control method as claimed in claim 13, wherein an addition and a detachment of the extra paths in a transmitting direction are preformed independently of an addition and a detachment of the extra paths in a receiving direction.

16. The pat control method as claimed in claim 13, wherein the extra paths are available to a plurality of groups of the virtual concatenated paths.

17. The path control method as claimed in claim 16, wherein a priority is assigned to one or more of the groups of the virtual concatenated paths, which are capable of using the extra paths.

18. The path control method as claimed in claim 17, wherein the extra paths available to the plurality of the groups of the virtual concatenated paths are assigned on a first-come-first-served basis.

19. The path control method as claimed in claim 14, wherein the sequence that adds and detaches the extra paths uses a J1 byte of a path overhead of a signal transmitted and received.

20. The path control method as claimed in claim 14, wherein the sequence that adds and detaches die extra paths uses an unused byte of a path overhead of a signal included in a multi-frame.

21. The path control method as claimed in claim 14, wherein the sequence that adds and detaches the extra paths uses an unused bit of an H4 byte of a path overhead of a signal included in a multi-frame.

22. The path control method as claimed in claim 13, wherein the extra paths are set up by a network operator.

23. The path control method as claimed in claim 13, wherein the extra paths are uniquely defined by an installation position of an interface panel.

24. The path control method as claimed in claim 13, wherein processing units used when an extra path is not used are provided separately from, processing units used when an extra path is used, which are selected by a selector accordingly.

* * * * *